(12) United States Patent
Le Chevalier

(10) Patent No.: US 11,538,205 B2
(45) Date of Patent: Dec. 27, 2022

(54) AUGMENTED REALITY MATHEMATICS IN LEARNING PLATFORMS

(71) Applicant: Chegg, Inc., Santa Clara, CA (US)

(72) Inventor: Vincent Le Chevalier, Waikoloa, HI (US)

(73) Assignee: Chegg, Inc., Santa Clara, CA (US)

( * ) Notice: Subject to any disclaimer, the term of this patent is extended or adjusted under 35 U.S.C. 154(b) by 43 days.

(21) Appl. No.: 16/576,604

(22) Filed: Sep. 19, 2019

(65) Prior Publication Data

US 2021/0004999 A1     Jan. 7, 2021

Related U.S. Application Data

(60) Provisional application No. 62/733,425, filed on Sep. 19, 2018.

(51) Int. Cl.
| | |
|---|---|
| *G06T 11/60* | (2006.01) |
| *G09B 5/02* | (2006.01) |
| *G09B 19/02* | (2006.01) |
| *G06T 7/60* | (2017.01) |

(52) U.S. Cl.
CPC ............... *G06T 11/60* (2013.01); *G06T 7/60* (2013.01); *G09B 5/02* (2013.01); *G09B 19/025* (2013.01)

(58) Field of Classification Search
CPC .. G06T 7/60; G06T 11/60; G09B 5/02; G09B 19/025
See application file for complete search history.

(56) References Cited

U.S. PATENT DOCUMENTS

| | | | |
|---|---|---|---|
| 9,380,275 B2* | 6/2016 | Davidson, Jr. ........ | G05D 1/0038 |
| 9,492,240 B2* | 11/2016 | Itkowitz ................. | A61B 34/30 |
| 9,767,613 B1* | 9/2017 | Bedikian ............. | G06F 3/04845 |
| 10,210,577 B1* | 2/2019 | Davis .................... | G06Q 10/087 |
| 2004/0018479 A1* | 1/2004 | Pritchard ................. | G09B 7/02 |
| | | | 434/350 |
| 2015/0293586 A1* | 10/2015 | Kritt ....................... | G06F 3/013 |
| | | | 345/158 |
| 2017/0205895 A1* | 7/2017 | Kasahara ................ | G06F 3/011 |
| 2017/0345218 A1* | 11/2017 | Bedikian ............... | G06F 1/1626 |
| 2018/0061132 A1* | 3/2018 | Lanier ..................... | G06F 3/013 |
| 2018/0330628 A1* | 11/2018 | Ahn ......................... | G09B 5/06 |
| 2018/0336728 A1* | 11/2018 | Edwards ............. | G06Q 10/063 |
| 2019/0065027 A1* | 2/2019 | Hauenstein ........... | G06F 3/0484 |
| 2019/0147115 A1* | 5/2019 | Liu ......................... | G06F 30/13 |
| | | | 703/1 |

* cited by examiner

*Primary Examiner* — Phi Hoang

(57) ABSTRACT

A method of automatically providing personalized augmented mathematical learning content and activities to users of an online learning platform is described. Upon detecting that a user has captured an image or a video stream, one or more points of interest in the image or video stream are determined. Augmented mathematical information is then detected for the one or more points of interest and superimposed on the captured image or video stream.

21 Claims, 8 Drawing Sheets

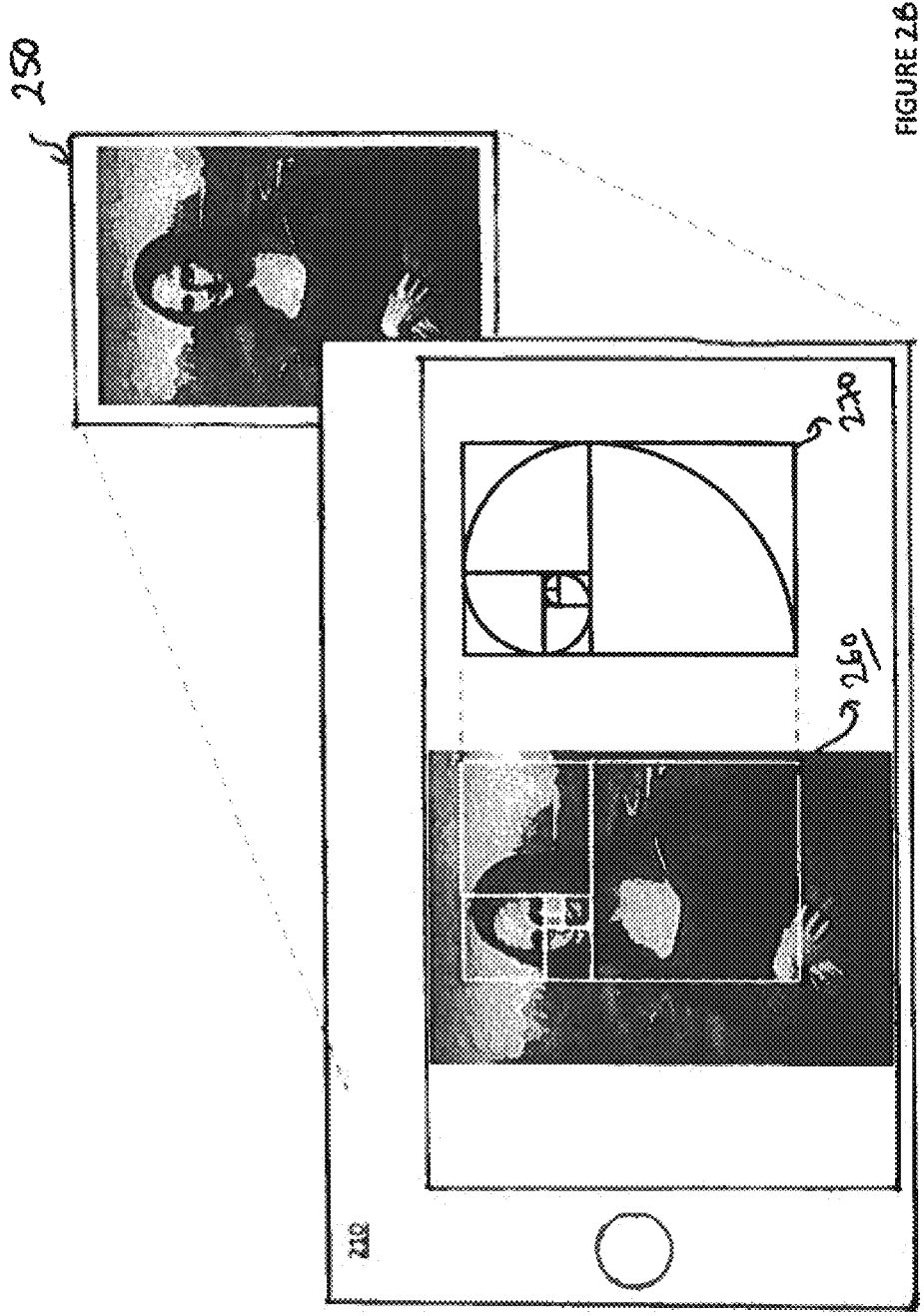
FIGURE 2.B

AUGMENTED REALITY MATHEMATICS IN LEARNING PLATFORMS

CROSS-REFERENCE TO RELATED APPLICATIONS

This application claims the benefit of U.S. provisional application No. 62/733,425 titled "Augmented Reality Mathematics in Learning Platforms" filed on Sep. 19, 2018, which is herein incorporated by reference in its entirety for all purposes.

TECHNICAL FIELD

The following relates to automatically providing mathematical information related to a point or object of interest overlaid onto a video feed of a location or area in which the point or object exists to users of an online learning platform.

BACKGROUND

Augmented reality systems supplement reality, in the form of a captured image or video stream, with additional information. In many cases, such systems take advantage of a portable electronic device's imaging and display capabilities and combine a video feed with data describing objects in the video. In some examples, the data describing the objects in the video can be the result of a search for nearby points of interest.

While many types of supplemental information for a point or object of interest are available, none provide mathematical information. There is a need for an online learning platform that provides mathematical information for points or objects of interest.

BRIEF DESCRIPTION OF THE DRAWINGS

For a better understanding of the various described implementations, reference should be made to the Detailed Description below, in conjunction with the following drawings.

FIGS. 2A-2C illustrate screenshots of various captured images that have been visually augmented with mathematical information in accordance with some embodiments.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
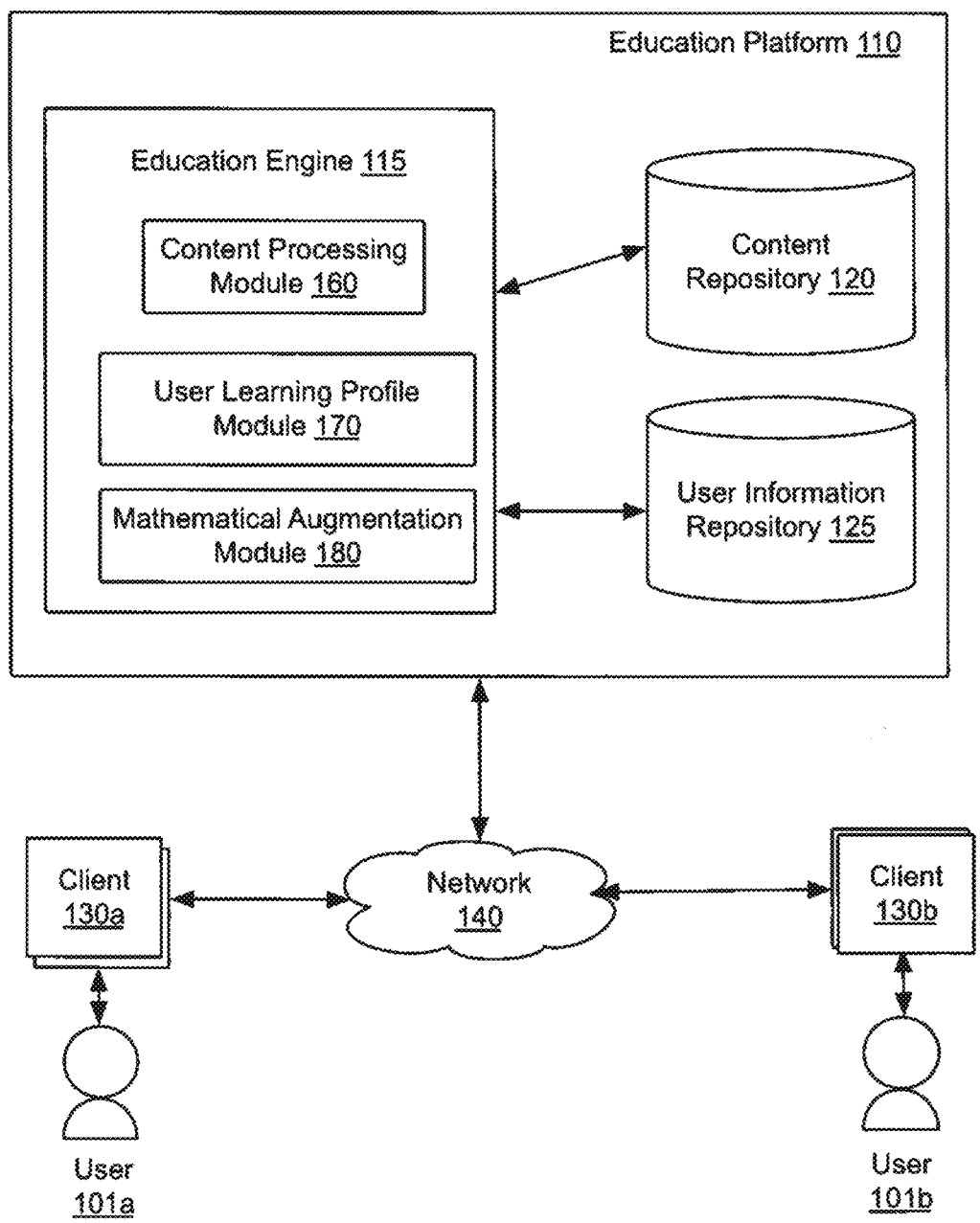
FIG. 1 illustrates an online education system 100 in accordance with some embodiments.

FIG. 1 illustrates an online education system 100 in accordance with some embodiments. Education system 100 includes an education platform 110 that provides personalized mathematical information to a plurality of users, such as user 101. While FIG. 1 only illustrates two users 101a and 101b, in some implementations, thousands, even millions of users use education platform 110 to access or receive personalized mathematical information about points of interest.

The education platform 110 is communicatively coupled to client device 130 via a network 140. A user 101 may access education platform 110 using one or more client devices 130. A client 130 accesses digital content from education platform 110 through network 140 and presents digital content to user 101. In some embodiments, client device 130 is an augmented reality enabled device that enables a user 101 to have an immersive experience navigating the personalized mathematical content and activities. Client 130 may include software, such as an augmented reality applied mathematics application (not shown) for rendering digital mathematical content and related activities received from platform 110. The augmented reality applied mathematics application may execute on the client device 130 or in a browser application that executes on the client device 130. FIG. 1 illustrates only a single user 101 with client device 130. But, there could be thousands, even millions of users, each with one or more associated client devices.

Network 140 enables communications among the entities connected to them through one or more local-area networks and/or wide-area networks. In one embodiment, network 140 is the Internet and uses standard wired and/or wireless communications technologies and/or protocols. Data exchanged over network 140 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

Education platform 110 stores mathematical educational content items and serves these items to users of client devices 130 in accordance with some implementations. In the illustrated embodiment, the education platform 110 includes a mathematical content repository 120, a user information repository 125, and a mathematical educational content and learning activities engine 115, referred to as the mathematical education engine 115 hereafter. In some implementations (not illustrated), content repository 120 or a portion thereof, is provided by a third-party (not shown) and may be communicatively networked with mathematical education engine 115, such as, via network 140.

Figure 5:
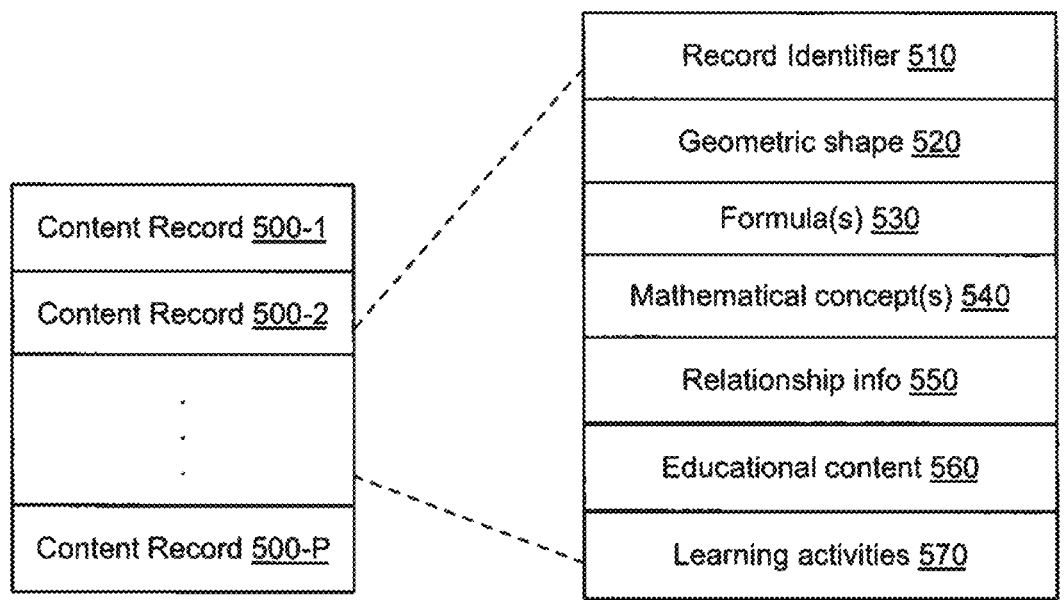
FIG. 5 depicts an example data structure for storing educational content and learning activity content in accordance with some implementations.

Content in mathematical content repository 120 includes a plurality of mathematical content records, which are discussed further with reference to FIG. 5.

Mathematical education engine 115 provides gamified personalized mathematical learning information and activities to users of education platform 110. Mathematical education engine 115 includes a content processing module 160, a user learning profile module 170, and a mathematical augmentation module 180.

Content processing module 160 processes content captured by user device 130 (e.g., captured video streams, images, etc., such as captured image 205) as well as user interactions with mathematical content and activities. User learning profile module 170 generates user records for each user of education platform 110, and stores these user records in the user information repository 125, which is discussed further with reference to FIG. 4.

Mathematical augmentation module 180 generates gamified personalized mathematical learning information and activities for users of education platform 110. In some implementations, mathematical augmentation module 180 employs Artificial Intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g., genetic algorithms), swarm intelligence (e.g., ant algorithms), and hybrid intelligent systems (e.g., expert inference rules generated through a neural network or production rules from statistical learning).

Many conventional features, such as firewalls, load balancers, application servers, failover servers, network management tools and so forth are not shown so as not to obscure the features of the system. A suitable service for implementation of the education platform is the CHEGG® service, found at www.chegg.com; other education platform services are known as well, and can be adapted to operate according to the teaching disclosed here. The term "service" in the context of the education platform 110 represents any computer system adapted to serve content using any internetworking protocols and is not intended to be limited to content uploaded or downloaded via the Internet or the HTTP protocol. The term "module" refers to computer program logic for providing a specified functionality. A module can be implemented in hardware, firmware, and/or software. A module is typically stored on a computer-readable storage medium such as storage device, loaded into a memory, and executed by a processor. In general, functions described in one embodiment as being performed on the server side can also be performed on the client side in other embodiments if appropriate. In addition, the functionality attributed to a particular component can be performed by different or multiple components operating together.

Figure 2A:
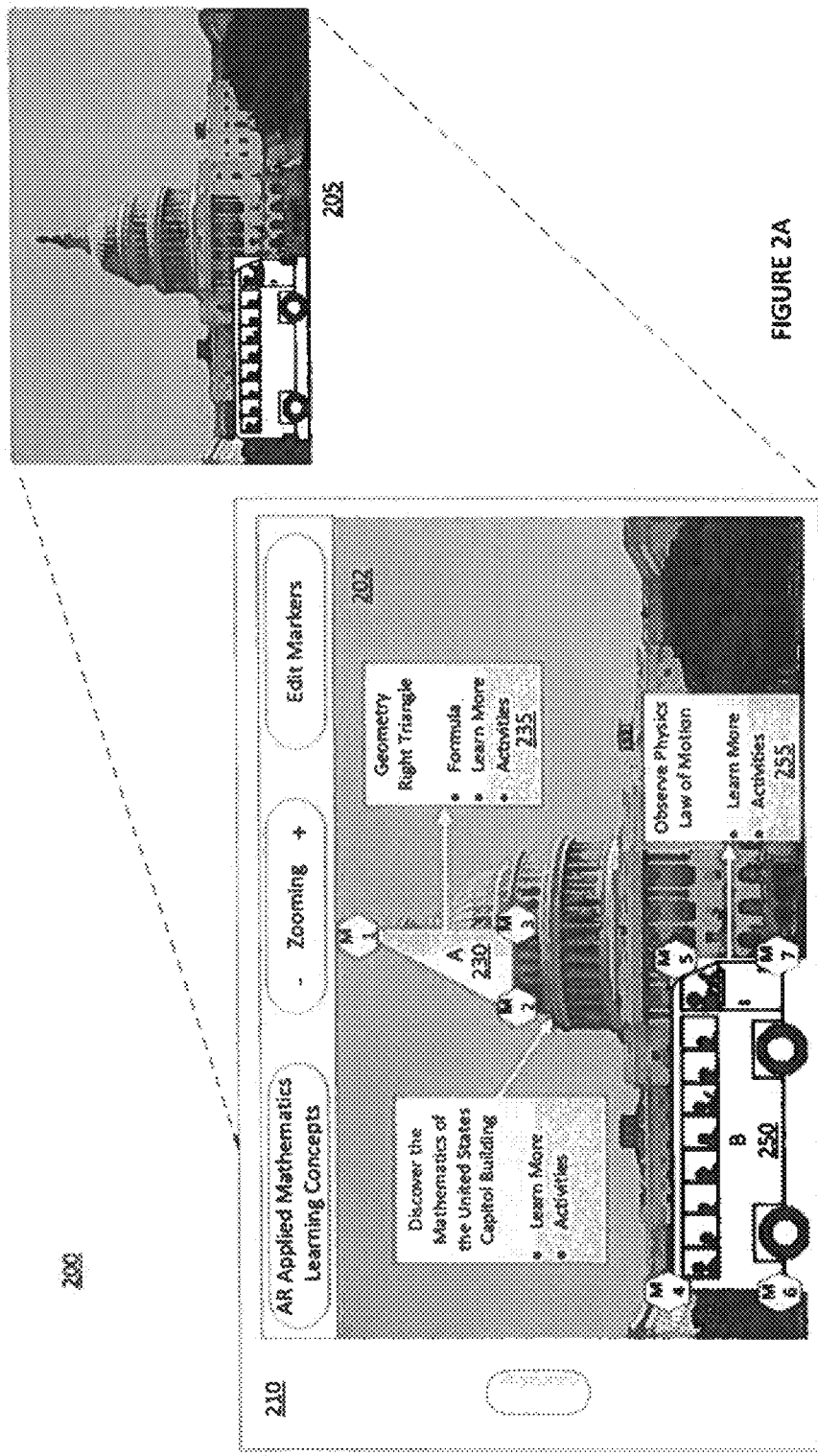
Figure 2C:
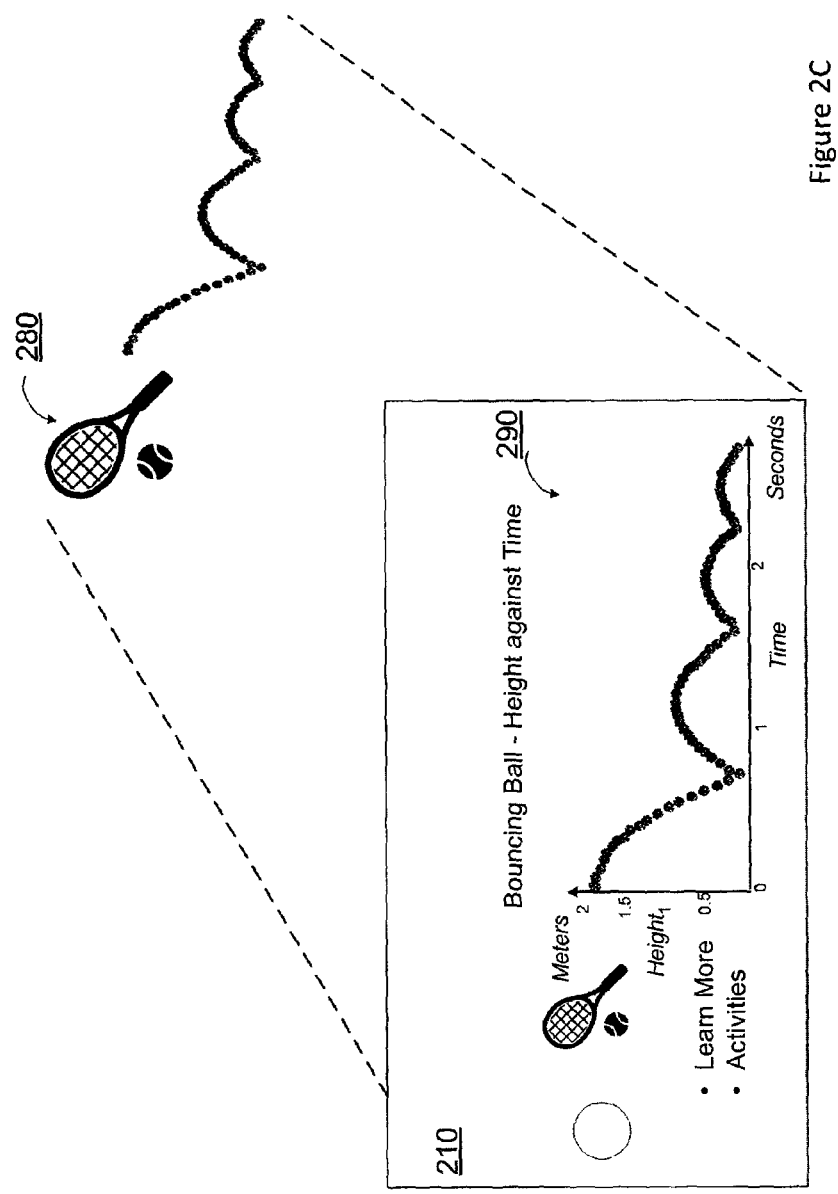

FIGS. 2A-2C depict various screenshots illustrating an augmented reality embodiment as described herein.

FIG. 2A illustrates a captured and presented image 205 using an image capture device, such as, the camera of a smart phone. As illustrated, a augmented reality enabled communication device 210 (such as device 130) has captured an image 205 of the United States Capitol Building using its image-capturing device and displayed the image on its display 202. The scene captured in image 205 also includes a bus that is parked in front of the United States Capitol Building. As illustrated, the captured image has been augmented with mathematical information corresponding to various points of interest.

When the user captures an image using a camera of the augmented reality device 130, one or both of the mathematical education engine 115 and augmented reality applied mathematics application displays mathematical information pertaining to one or more objects of interest in the captured image. The augmented mathematical information is superimposed over the one or more objects of interest in the captured image. Examples of mathematical information include geometrical shape(s) that constitute the object of interest, formula associated with the geometrical shape, other mathematical information such as mathematical concepts, and educational activities associated with the geometrical shape.

In this illustrated embodiment, one or more of the augmented reality applied mathematics application and mathematical education engine 115 has overlaid the following information onto the image 205: (i) a triangle 230 over the dome of the U.S. Capitol Building, where the triangle 230 has three vertices represented by markers M1, M2 and M3; (ii) supplemental mathematical information 235 corresponding to the triangle 230; (iii) supplemental mathematical information 240 corresponding to the U.S. Capitol Building; (iv) a rectangle 250 over a bus driving by the U.S. Capitol Building, where the rectangle 250 has four vertices represented by markers M4-M8; and (v) supplemental mathematical information 255 corresponding to the bus.

As illustrated, supplemental mathematical information 235 corresponding to the triangle 230 includes the name of the shape ("Right Triangle"), either one or more formulas for right angle triangles, or links thereto, a "Learn More" feature that enables a user to access additional information about right angle triangles and possibly related shapes, and learning activities associated with the shape that are mathematical in their content. The additional information might also include size, lengths of various sides, of the right angle triangle 230 that has been superimposed on image 202. Examples of learning activities associated with the right triangle shape might be a game in which the user has to classify triangles, draw triangles, etc., or one in which the user watches a video about triangles, etc. Supplemental mathematical information 240 corresponding to the U.S. Capitol Building includes a "Learn More" feature that enables a user to access additional information about the U.S. Capitol building, and learning activities associated with the U.S. Capitol Building that are mathematical in their content. Examples of mathematical learning activities associated with the U.S. Capitol Building include a video about various mathematical proportions in its architecture. Supplemental mathematical information 255 corresponding to the bus includes a "Learn More" feature that enables a user to access additional information about laws of motion of physics, and learning activities associated with the laws of motion that are mathematical in their content.

As discussed later with reference to FIG. 3, the markers M1-M3 and M4-M7 enable a user to interact with respective geometric shapes. For example, a user can move one or more of the markers M1-M3 to manipulate the right angle triangle, to expand it, contract it, to zoom in or out.

FIG. 2B is a screenshot of a captured image 250 of the famous Mona Lisa painting on display 210. The captured image 250 has been augmented with a various rectangles 260. As illustrated, the various rectangles 260 are organized in the golden ratio, and the user can interact with element 270 to learn more mathematical information about the golden ratio, and perform mathematical activities pertaining thereto. This way, the user can learn about rectangles as well as about the mathematical concept of golden ratio.

FIG. 2C is a screenshot of a captured image 280 of a ball being bounced on display 210. The captured image 280 has been augmented with a drawing 290 of a table illustrating how a bouncing ball loses energy and eventually stops. User can interact with the augmented information to learn more mathematical information about the associated mathematical concepts such as kinetic energy, laws of conservation of energy, etc. and perform mathematical activities pertaining thereto. Not shown in FIG. 2C, is that various geometric shapes may also be superimposed on the ball and racquet itself. For example, the ball is an example of a sphere and accordingly a circle may be overlaid onto the captured image of the ball, allowing a user to then learn mathematical information about circles, and/or spheres.

Figure 3:
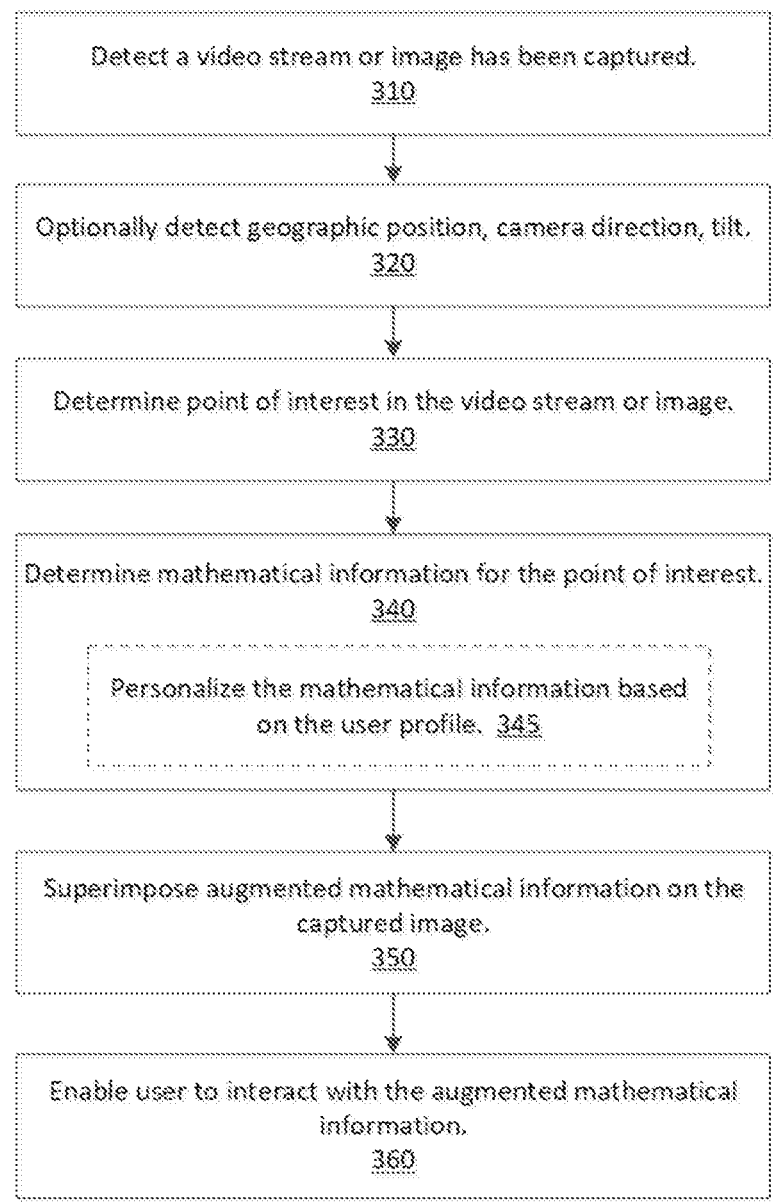
FIG. 3 is a flowchart illustrating a method of displaying augmented mathematical information in accordance with some embodiments.

FIG. 3 is a flow chart illustrating an exemplary method 300 of preparing and displaying an augmented reality point of interest with personalized mathematical content. Method 300 is performed, for example, by education engine 115 and augmented reality applied mathematics application. Steps in the method 300 that are not order-dependent may be reordered and steps may be combined or broken out. In some embodiments, the method 300 is performed in real-time as a user captures a live video stream or image. In other embodiments, the method 300 is performed on previously captured video streams or images. For example, a user 101 may have taken a photo of the U.S. Capitol building last year on a visit to Washington D.C., and now may wish to learn mathematical information about the building.

At block 310, the method starts when the augmented reality applied mathematics application detects that a video stream has been captured by device 130. User 101 uses device 130 to capture a scene, such as a building, a tree, road, a painting, a sports scene, etc. Although described here in reference to a video stream, another embodiment of the disclosed technology includes capturing and displaying a single still image or a series of still images.

At block 320, the augmented reality applied mathematics application optionally detects or obtains one or more of geographic position (e.g., GPS data), camera direction, and/or tilt of device 130.

At block 330, the augmented reality applied mathematics application processes the detected information (if obtained, at block 320) and video stream or image (at block 310) to determine objects/points of interest that occur in the captured video stream or image. For example, GPS information for the device 130 may indicate that the device 130 is in the vicinity of the U.S. Capitol Building. This indication is used to then filter the possibilities of images in the captured video stream to the U.S. Capitol Building. In some embodiments, this processing is performed in whole or in part by the mathematical augmentation module 180. In other embodiments, the processing is based solely on the captured image itself and used to determine the objects/points of interest that occur in the captured video stream or image.

A point or object of interest (referred hereafter as "point of interest") can be any object that can be viewed in a captured image and that can be decomposed into one or more geometrical shapes. A point of interest can be a place, building, structure, object, etc. and can be stationary or mobile. A point of interest may exist in various environments or contexts, such as in architecture, arts, sports, physics, nature, biology.

For example, in the architectural context, a point of interest captured by a client device 130 may include a building, which may be decomposed into geometric shapes and used to display augmented mathematical information. An example is provided in FIG. 2A, in which the U.S. Capitol building is used to overlay a triangle 230 that composes the dome of the building.

In the arts context, a point of interest captured by a client device 130 may include a painting, which may be decomposed into geometric shapes, and used to display augmented mathematical information. FIG. 2B illustrates a captured image of the famous Mona Lisa painting. As illustrated, the golden ratio concept is superimposed on the captured image of the painting. As another example, in the arts context, a point of interest captured by a client device 130 may include a rug, which may be decomposed into geometric shapes, and used to illustrate the mathematical concept of symmetry. In the nature context, a point of interest captured by a client device 130 may include a tree, which may be decomposed into geometric shapes, and used to illustrate fractals. As another example, in the nature context, a point of interest captured by a client device 130 may include a snowflake, which may be decomposed into geometric shapes, and used to illustrate six fold symmetry. As another example, in the nature context, a point of interest captured by a client device 130 may include a honeycomb, which may be decomposed into geometric shapes, and used to illustrate tessellations. As another example, in the nature context, a point of interest captured by a client device 130 may include a bird in motion, which may be decomposed into geometric shapes, as well as used to illustrate laws of movement, inertia, acceleration, etc.

In the sports context, a point of interest captured by a client device 130 may include various actions in sporting events such as games, which may be decomposed into geometric shape(s) (such as, trajectories of motion) and used to illustrate Newton's laws, laws of movement, inertia, acceleration, etc. FIG. 2C illustrates a captured image of a bouncing ball. As illustrated, the image and augmented mathematical information is used to teach laws of conservation of energy.

At block 340, the augmented reality applied mathematics application and/or the education engine 115 determine mathematical information for the object of interest that have been deemed to occur in the captured video stream. In some embodiments, a lookup is performed of the mathematical content repository 120, which stores raw material for the mathematical information as content records 500 and is discussed further with reference to FIG. 5. The mathematical information that are accessed is one or more of: geometrical shape(s) that constitute the point of interest, formula and other information associated with the geometrical shape, and educational activities associated with the geometrical shape. The formula and other information associated with the geometrical shape include: (i) formulas, such as, for surface area, volume, lateral area, trigonometric ratios, circumference, Pythagorean theorem; (ii) concepts, such as, for golden ratio, symmetry, fractals, dots, tessellations, spirals, and Newton's laws, patterns; and (iii) relationship information, such as, a hexagon is a type of polygon, a circle is a type of ellipse, etc. Examples of mathematical educational activities include: providing information (e.g., a Wikipedia article) on a mathematical topic, presenting a quiz on formulas, etc.

Figure 4:
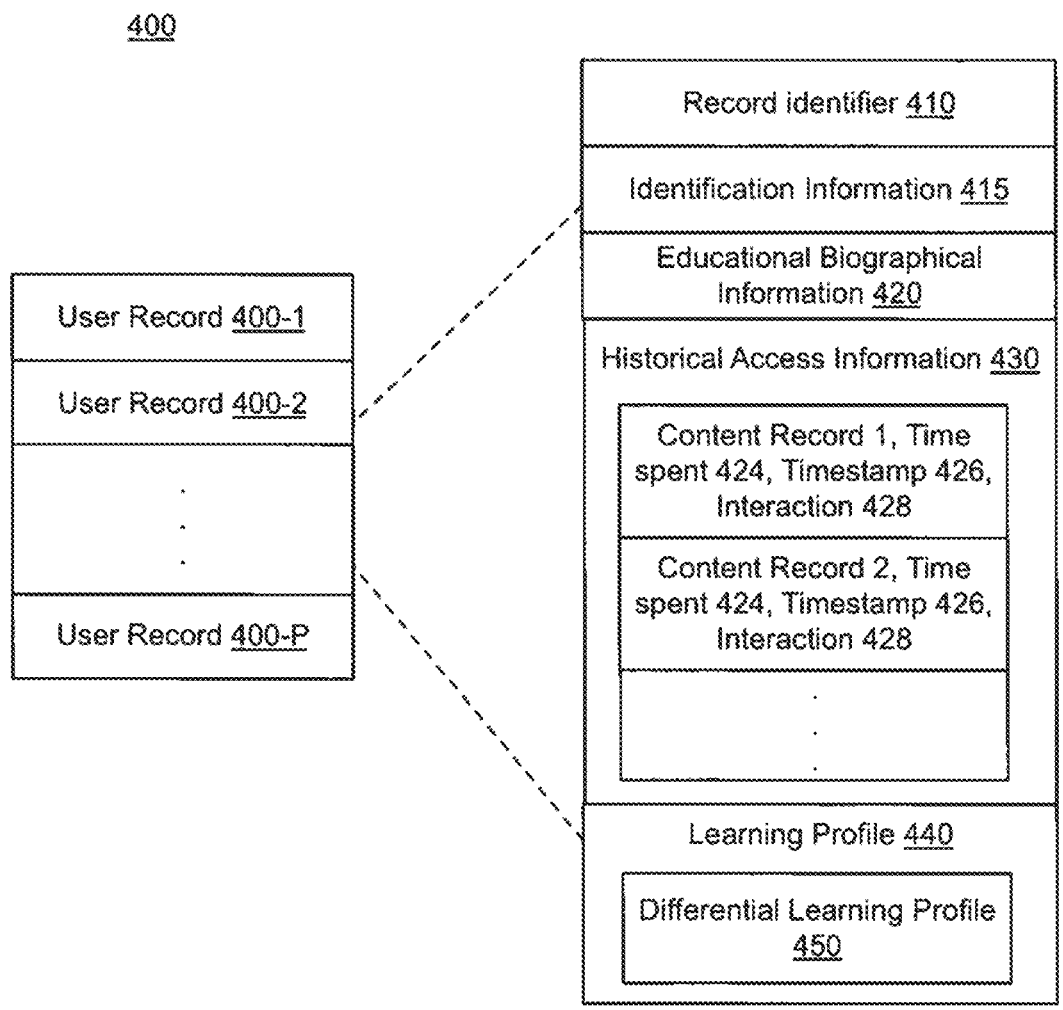
FIG. 4 depicts an example data structure for storing user information in some implementations.

In some embodiments, optionally, at block 345, the mathematical educational information is personalized based on a user profile stored in user record, which is discussed further with reference to FIG. 4. The user profile is generated by the user learning profile module 170 and stored in user information repository 125. Accordingly, if the user profile indicates that the user 101 is a beginner student, of young age, etc., that user may be shown simpler explanations, formulae, educational activities as compared with another user who is a more advanced student, older, etc. Another example of personalization is deciding which information and activities to present to a user. For example, if a user's learning profile indicates that the user has already seen a particular video, or performed a particular quiz, then different content and activities may be presented to the user.

At block 350, the augmented reality applied mathematics application superimposes the mathematical information (from block 340) over the one or more objects of interest in the captured image. An example is provided in FIG. 2A, in which a triangle 230 is superimposed on the dome of a captured image of the U.S. Capitol building. Another example is provided in FIG. 2B, in which a drawing illustrating the golden ratio concept is superimposed on a captured image of the Mona Lisa painting.

In some embodiments, at block 350, augmented mathematical information is superimposed or overlaid on the captured image. In some embodiments, first mathematical information (e.g., geometric shapes) is superimposed on the point of interest. For example, referring to FIG. 2A, right angle triangle 230 is superimposed on the dome of the U.S. Capitol Building, and rectangle 250 is superimposed on the bus in the captured image 205. Referring to FIG. 2B, several rectangles 260 are superimposed on the image of the Mona Lisa painting. Second mathematical information (e.g., learning activities, links to formulas, etc.) is not superimposed or overlaid on the point of interest itself. Rather, indicators (such as, hyperlinks) of the availability of the second augmented mathematical information are superimposed on other portions of the captured image. Referring back to FIG. 2A, the triangle 230 (corresponding to first mathematical information) is superimposed on the dome of the captured image of the U.S. Capitol building, but if the user wishes further information (such as, formula of the triangle), the user may interact with the user interface 235, which is not superimposed on the point of interest (here, the U.S. Capitol Building), but is superimposed on a portion of the captured image 205 just to the right of the dome of the U.S. Capitol Building.

Further, in some embodiments, different combinations and permutations of augmented mathematical information (e.g., geometric shapes) are superimposed or overlaid on the captured image. It can be understood that any object can be seen as being composed of many different combinations of geometric shapes. For example, a rectangle can be decomposed into constituent rectangles, or constituent triangles, or constituent triangles and rectangles. Accordingly, a user may be first presented with first augmented mathematical information, but presented with a different augmented mathematical information at a later time. The second presentation may be in response to receiving a user request, or may be made automatically, e.g., after a certain amount of time has passed.

At block 360, the augmented reality applied mathematics application may enable user 101 to select, view, and interact with the superimposed mathematical information to perform a variety of actions.

One user action is manipulation of geometrical shape(s). One example of user manipulation is rotation, expansion or contraction of the geometric shape. Referring to FIG. 2A, such user actions may include: (i) manipulating vertices of a geometrical shape (e.g., markers M1-M3 of triangle 230, and makers M4-M7 of rectangle 250) to manipulate the geometrical shape, (ii) obtain supplemental mathematical information about the point/object of interest in the captured image (e.g., obtain mathematical information 240 for the U.S. Capitol Building), and (iii) obtain supplemental mathematical information about the constituent geometrical shape(s) displayed in the captured image (e.g., obtain mathematical information 235 corresponding to the triangle 230 and mathematical information 255 corresponding to the rectangle 250).

One example of user manipulation is zooming in/out of the geometric shape. For example, a user 101 may be able to zoom into a complex geometrical shape such as a polygon to view more granular shapes (e.g., triangles) that constitute the polygon.

Another feature that may be available is a search feature that allows a user to enter a search term (e.g., "triangle") in a search bar (not shown) to conduct a search for a specific geometric shape. In some embodiments, one or both of the mathematical education engine 115 and augmented reality applied mathematics application determines the existence of the search term (e.g., "triangle") in the captured image 205 and displays the search results, if any.

Another user action is a do-it-yourself feature that enables a user to discover geometric shapes themselves in a captured image. Accordingly, the user may provide input of geometric shapes, e.g., using their finger or stylus, or using hand gestures. In some embodiments, one or both of the mathematical education engine 115 and augmented reality applied mathematics application processes the user input to display the user-input shape and provides feedback and associated supplemental mathematical information for the geometrical shape(s). As an example, referring to FIG. 2A, user 101 may use a pen or stylus to draw a triangle on the screen of user device 101 corresponding to where the dome of the U.S. Capitol Building is displayed in the captured image. In response to this user input, a triangle 230 is superimposed on the captured image.

In some embodiments, the do-it-yourself feature is spurred on by one or both of the mathematical education engine 115 and augmented reality applied mathematics application. Accordingly, the one or both of the mathematical education engine 115 and augmented reality applied mathematics application provide some information about a shape, such as, a formula (e.g., surface area for a triangle), or name of shape (e.g., right angle triangle), and ask the user to find the corresponding shape (e.g., right angle triangle) in the captured image (e.g., 202) and draw it on the captured image. An example of a user prompt might be: "Find and draw a right angle triangle in this scene." Further, optionally, dimensions may be provided. An example of a user prompt might be: "Find and draw a circle with 2 cm radius in this scene." In yet another implementation of the do-it-yourself feature, the user is asked to find and draw a shape on the captured image in a timed manner. An example of such a command might be "Find and draw a circle with 2 cm radius in 20 seconds in this scene." These are examples of gamifying mathematics for a user and may help the user learn to identify and draw geometric shapes and mathematical concepts.

Another user action is a multi-user mode, in which two or more users who are capturing the same scene (e.g., 202) are prompted to perform mathematical activities in a collaborative, exploratory, or competitive manner. Accordingly, upon determining that two or more users are in the same location and capturing the same scene, the users may be prompted to compete with each other in identifying geometric shapes. An example of a user prompt that promotes competition might be: "Can you find and draw a right angle triangle in this scene faster than User X?"

FIG. 5 depicts an example data structure 500 for the mathematical content repository 120 for storing mathematical educational content and learning activity content in accordance with some implementations. Content repository 120 includes a plurality of content records 500-1 to 500-P, each of which corresponds to a discrete content unit. In some implementations, content repository 120 stores extremely large number of content records, such as in the millions, etc. In some implementations, each content record 500 for a content unit includes: a unique record identifier 510 that identifies the particular content record; image(s) 520 corresponding to a geometric shape for the record; one or more formulae 530 corresponding to the geometric shape; mathematical concept(s) or law(s) 540 corresponding to the geometric shape; relationship information 550 listing relationship to other shapes and possibly links (e.g., hyperlinks) to the other related shapes; mathematical educational content 560 related to the geometric shape, mathematical concept(s) or law(s) (such as, definitions, videos, etc.); and associated educational learning activities 570.

In some embodiments, a learning activity 570 is one of passive, active, and recall. Activities are defined as "passive" when a user interacts with already created content, such as when a user looks at a video for a Newton's laws. Activities are defined as "active" when a user creates new own user generated content, such as, personal notes, highlights, citations, and other comments, and connects and exchanges feedback with peers, among others. Recall activities test a user against knowledge acquired from passive and active activities. In some cases, recall activities are used for evaluating student performance in the context of an educational course, and may include homework assignments, tests, quizzes, and the like.

Referring again to FIG. 1, educational platform 110 includes a user information repository 125, which stores a user record associated with each user 101 of education system 100. FIG. 4 depicts an example data structure 400 for the user information repository 125 for storing user information for user 101 in some implementations. User information repository 125 includes a plurality of user records 400-1 to 400-P, each of which corresponds to a unique user 101.

A user record 400 may include: a unique record identifier 410 that identifies the particular user record; identification information 415 for the user, such as, the user's name, email address, age, address, mobile device number, etc.; educational biographical information 520; and historical access information 430 including records of user's activities on the educational platform 110.

Educational biographical information 420 may include historical and current biographical information, such as universities attended by the user, courses taken, grades in those courses, courses currently registered for, major(s) declared, degree(s) obtained, degree(s) user wishes to obtain, and so on. Educational biographical information 420 may also include a calendar of user's personal, social, and educational commitments, such as upcoming assignment deadlines, upcoming exam deadlines, etc.

Historical access information 430 indicates which content in mathematical content repository 120 has been accessed by user 101. In some embodiments, historical access information 430 indicates content that has accessed by the user while viewing augmented content, such as illustrated in FIGS. 2A-2C, or while performing mathematical learning activities, also illustrated in FIGS. 2A-2C. Access information 430 may also indicate amount of time spent 424 by user 101 on each content, and optional timestamps 426 of time of access. Access information 430 may also indicate attributes of interaction 428 by user 101 with content 322. In some embodiments, attributes of interaction 428 indicates whether the user's activity was passive, active, or recall.

A user record 400 may further include a learning profile 440 for user 101. Learning profile 440 may indicate one or more preferred modes of learning for user 101 and may indicate preferences for: type of activity preferred (e.g., active, passive, or recall), type of content (e.g., video, lecture, book, etc.), duration of activity (short vs. long), and so on. For example, one user may learn better by watching videos, while another may learn better by reading text. In another example, one user may learn better if learning sessions are frequently interspersed with non-learning recreational sessions, while another may learn better with long undisturbed sessions. In another example, one user may learn better by repetition or refreshing of previously learned material, while another may prefer mostly or all new material. In yet another example, user 101 may have different preferred modes of learning for different subjects, courses, topics within a subject or course, or even concepts within a subject or course. In yet another example, user 101 may have different preferred modes of learning at different times. For example, at the beginning of an academic term, user 101 may prefer a first mode of learning (such as, a recall activity comprising refresh of material learned in a preceding class, use of a lot of exercises to learn new topics), and at the end of an academic term, user 101 may prefer a second mode of learning (such as, a recall activity comprising refresh of material learned in current class).

Figure 6:
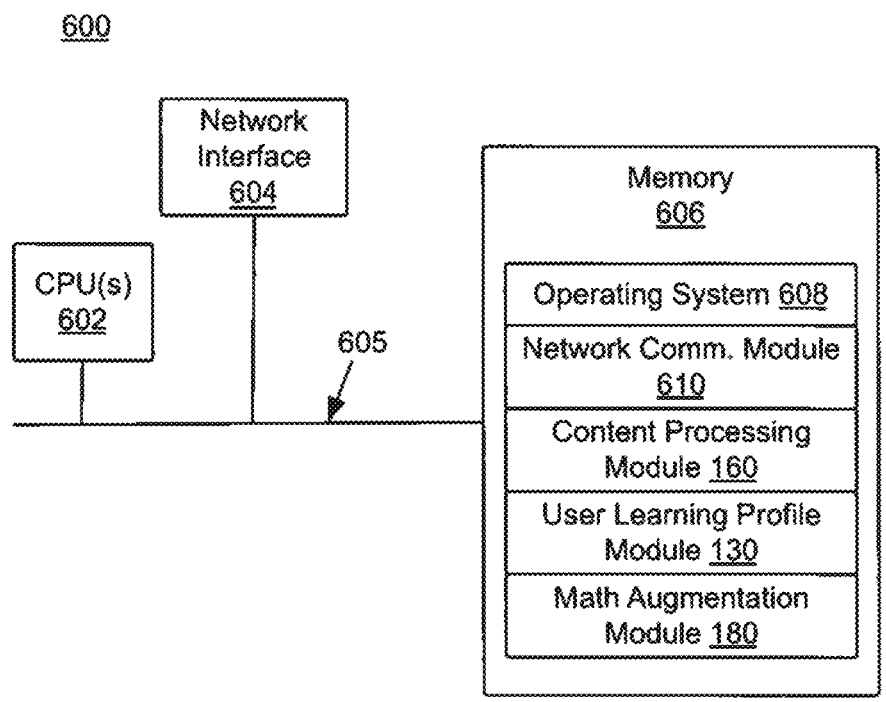
FIG. 6 is a block diagram of a server system in accordance with some embodiments.

FIG. 6 is a block diagram of a server system 600 in accordance with some embodiments. The system 600 may be an example of the education engine (FIG. 1). The system 600 typically includes one or more processors 602 (e.g., CPUs and/or GPUs), one or more network interfaces 604 (wired and/or wireless), memory 606, and one or more communication buses 605 interconnecting these components.

Memory 606 includes volatile and/or non-volatile memory. Memory 606 (e.g., the non-volatile memory within memory 606) includes a non-transitory computer-readable storage medium. Memory 606 optionally includes one or more storage devices remotely located from the processors 602 and/or a non-transitory computer-readable storage medium that is removably inserted into the server system 600. In some embodiments, memory 606 (e.g., the non-transitory computer-readable storage medium of memory 606) stores the following modules and data:

- an operating system 608 that includes procedures for handling various basic system services and for performing hardware-dependent tasks;
- a network communication module 610 that is used for connecting the education engine 115 to other computing devices via one or more network interfaces 604 connected to one or more networks 140 (FIG. 1);
- content processing module 160 or a portion thereof;
- user learning profile module 170 or a portion thereof; and
- mathematical augmentation module 180 or a portion thereof.

Each of the modules stored in memory 606 corresponds to a set of instructions for performing one or more functions described herein. Separate modules need not be implemented as separate software programs. The modules and various subsets of the modules may be combined or otherwise re-arranged. In some embodiments, memory 606 stores a subset or superset of the modules and/or data structures identified above.

FIG. 6 is intended more as a functional description of the various features that may be present in a server system than as a structural schematic. In practice, items shown separately could be combined and some items could be separated. For example, some items shown separately in FIG. 6 could be implemented on a single server and single items could be implemented by one or more servers. The actual number of servers used to implement the system 600, and how features are allocated among them, will vary from one implementation to another.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of delivering mathematical content to a client device, the method comprising:
    determining at least one point of interest in an image of a real-life scene captured and displayed at the client device;
    determining mathematical information corresponding to the at least one point of interest, wherein the mathematical information includes a geometrical shape that constitutes the at least one point of interest; and
    visually augmenting the at least one point of interest in the image with the mathematical information.

2. The method of claim 1, wherein the mathematical information includes a mathematical formula.

3. The method of claim 1, wherein the mathematical information includes educational activities.

4. The method of claim 1, wherein the mathematical information includes one or more mathematical concepts.

5. The method of claim 1, wherein the visually augmenting includes superimposing the mathematical information on the at least one point of interest in the image.

6. The method of claim 1, wherein the image is captured using the client device, the method further comprising:
    enabling interaction with the mathematical information using the client device.

7. The method of claim 6, wherein the interaction includes manipulation of the mathematical information.

8. The method of claim 6, wherein the interaction includes zoom operations involving the mathematical information.

9. The method of claim 6, further comprising updating a user profile associated with a user of the client device based on the interaction.

10. The method of claim 1, wherein the determining the mathematical information comprises searching a mathematical content repository that stores a plurality of mathematical content records.

11. The method of claim 10, wherein the searching the mathematical content repository includes personalizing the mathematical information for a user profile associated with a user of the client device.

12. The method of claim 10, wherein the searching the mathematical content repository includes gamifying the mathematical information for a user profile associated with a user of the client device.

13. A method of delivering mathematical content to a client device, the method comprising:
    at a client device with a camera,
        capturing an image of a physical structure;
        determining at least one point of interest in the captured image of the physical structure;
        determining mathematical information corresponding to the at least one point of interest in the captured image of the physical structure, wherein the mathematical information includes a geometrical shape that is found within the at least one point of interest; and
        visually augmenting the at least one point of interest in the captured image with the mathematical information.

14. The method of claim 13, wherein the mathematical information includes a mathematical formula that is determined to be associated with the at least one point of interest in the captured image of the physical structure.

15. The method of claim 13, wherein the mathematical information includes one or more mathematical concepts that are determined to be associated with the at least one point of interest in the captured image of the physical structure.

16. The method of claim 13, wherein the visually augmenting includes superimposing the mathematical information on the at least one point of interest in the captured image of the physical structure.

17. The method of claim 13, the method further comprising:
    enabling interaction by a user with the mathematical information using the client device.

18. A method of delivering mathematical content to a client device, the method comprising:
    at a client device with a camera,
        capturing an image of a physical structure;
        determining at least one point of interest in the captured image of the physical structure;
        determining mathematical information corresponding to the at least one point of interest in the captured image of the physical structure;
        personalizing the mathematical information for a user profile associated with a user of the client device; and
        visually augmenting the at least one point of interest in the captured image with the mathematical information.

19. The method of claim 18, wherein the mathematical information includes a geometrical shape that is found within the at least one point of interest.

20. The method of claim 18, wherein the mathematical information includes a mathematical formula that is determined to be associated with the at least one point of interest.

21. The method of claim 18, wherein the mathematical information includes one or more mathematical concepts that are determined to be associated with the at least one point of interest.

* * * * *